United States Patent [19]
Descalo

[11] Patent Number: 5,351,983
[45] Date of Patent: Oct. 4, 1994

[54] CONVERTIBLE DUAL GOLF CART

[76] Inventor: Theresa A. Descalo, 973 Ferndale Blvd., Central Islip, N.Y. 11722

[21] Appl. No.: 48,186

[22] Filed: Apr. 20, 1993

[51] Int. Cl.⁵ .............................................. B62B 1/12
[52] U.S. Cl. .................................... 280/646; 248/96; 280/DIG. 6
[58] Field of Search ........................ 294/31.2; 248/96; 280/646, 645, 42, 651, 652, 655, 38, DIG. 5, DIG. 6

[56] References Cited

U.S. PATENT DOCUMENTS

| | | | |
|---|---|---|---|
| 1,313,959 | 8/1919 | Smith | 248/96 X |
| 1,475,605 | 11/1923 | Smith | 248/96 X |
| 2,723,864 | 11/1955 | Schierman | 280/47.24 |
| 2,985,462 | 5/1961 | Stamp | 280/47.19 |
| 3,328,043 | 6/1967 | Johnson | 280/1.5 |
| 4,061,360 | 12/1977 | Evans et al. | 280/652 |
| 4,142,736 | 3/1979 | Ackerfeldt et al. | 280/652 |
| 4,533,013 | 8/1985 | Hightower | 248/96 X |
| 4,681,341 | 7/1987 | Lai | 280/646 |
| 4,911,465 | 3/1990 | Hauer | 280/646 |
| 4,998,743 | 3/1991 | Thielen | 280/47.26 |

FOREIGN PATENT DOCUMENTS 733631  7/1955  United Kingdom .

OTHER PUBLICATIONS

Advertisement entitled "Caddies of the Future" of Golf Cart Supplies describing a golf cart entitled Kaddie Kart.

Primary Examiner—Karin L. Tyson
Assistant Examiner—Michael Mar
Attorney, Agent, or Firm—Alfred M. Walker

[57] ABSTRACT

The present invention relates to an adjustable golf cart for accommodating one or more golf club bags. The adjustable golf cart includes a plurality of movable generally C-shaped clamps and bases for holding either one or more than one golf club bags.

20 Claims, 4 Drawing Sheets

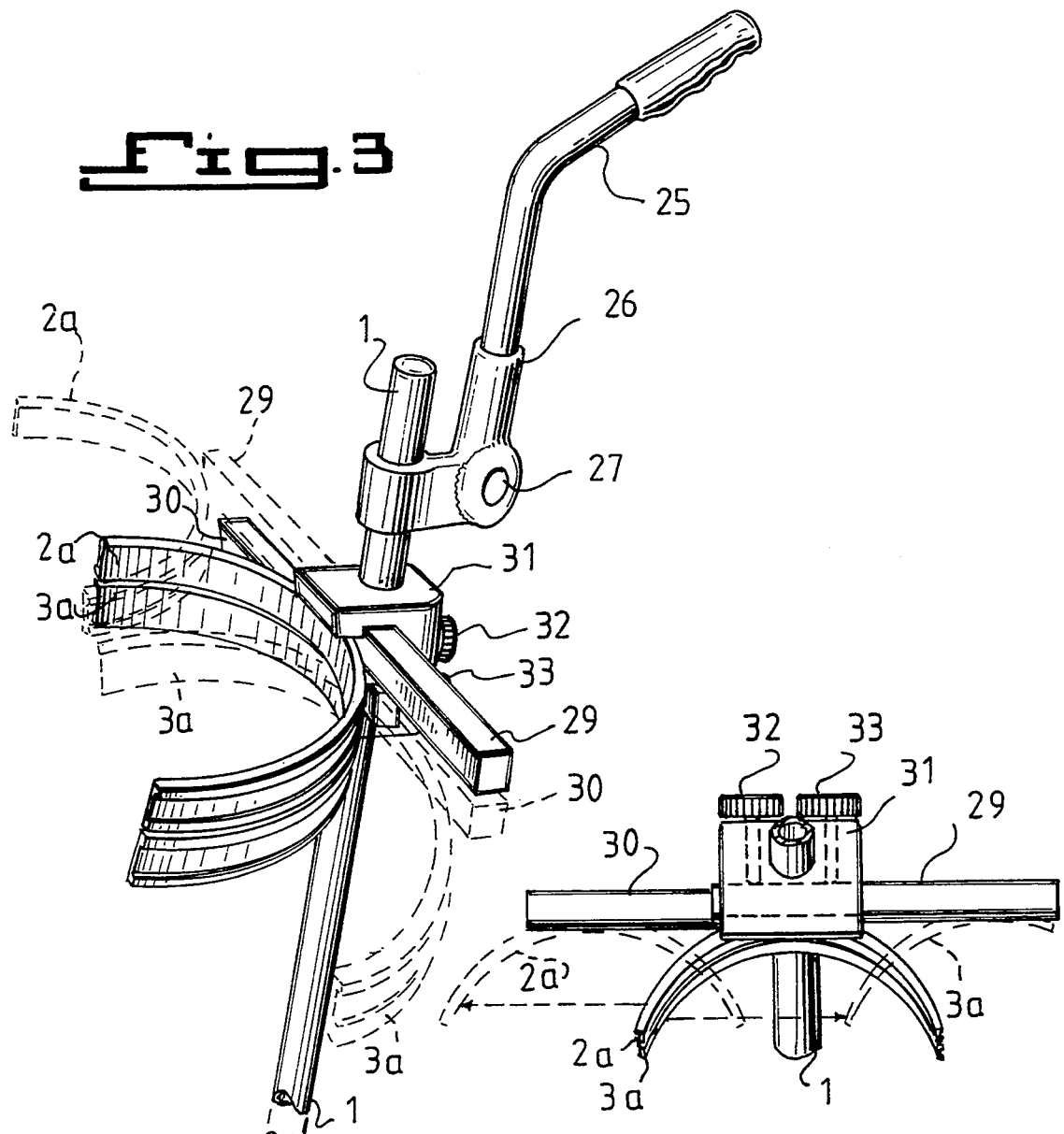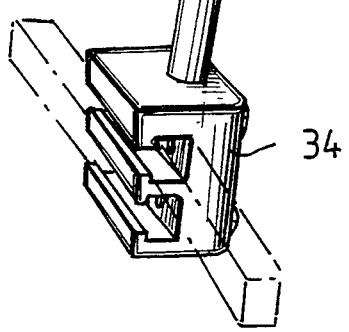

CONVERTIBLE DUAL GOLF CART

This application is based upon Disclosure Document No. 316885 dated Sep. 10, 1992, entitled "Double Carrier Golf Cart".

FIELD OF THE INVENTION

The present invention relates to an adjustable golf cart for accommodating one or more golf club bags. The adjustable golf cart includes a plurality of movable generally C-shaped clamps and bases for holding either one or more than one golf club bags.

BACKGROUND OF THE INVENTION

The prior art golf bag carriers generally disclose dual bag carriers, however, the carriers are not interchangeable for either one bag or two bags.

U.S. Pat. No. 4,061,360 of Evans et al discloses a collapsible golf bag cart for two golf bags, but it does not swing back from a carrier for two bags to a carrier for a single golf bag.

U.S. Pat. No. 4,142,736 of Ackerfeldt et al discloses a golf cart with a chassis accommodating two bags, but does not adapt for use with a single golf club bag.

U.S. Pat. No. 4,681,341 of Lai discloses a collapsible golf cart with a one step folding operation with a telescoping shaft between the wheels, but does not accommodate two golf club bags.

U.S. Pat. No. 4,998,743 of Thielen discloses a wheeled cart with a rack with small clips to hold golf clubs on a wall of the rack, but not an adjustable golf club carrier for one or more bags.

British patent no. 733,631 of Healey discloses a wheeled box container for golf clubs.

U.S. Pat. No. 2,985,462 of Stamp discloses a golf club carrier with a plurality of non-adjustable pockets for golf clubs.

U.S. Pat. No. 3,328,043 of Johnson discloses a belt coupling for attaching a golf cart to a wearer's belt for pulling the bag behind the wearer.

U.S. Pat. No. 2,723,864 of Schierman discloses a hand cart for transporting two cylinders. However, it is built as either a single cylinder can carrier or a dual cylinder can carrier, but is not convertible between a single and a double carrier.

U.S. Pat. No. 4,911,465 of Hauer discloses a single golf club carrier with a plurality of tubes to hold the golf clubs therein.

Non-patented literature references include a two page advertisement entitled "Caddies of the Future", of Golf Cart Supplies, describing a golf cart entitled "Kaddie Kart", for a wide golf cart carrier with a wide non-adjustable base to hold more than one golf club bag.

However, none of the above listed prior art patent references disclose an adjustable golf bag carrier cart which has a plurality of removably adjacent C-shaped clamps and a plurality of generally disk shaped base portions which hold one bag when the clamps and bases are in respective positional register with each other clamp or base, or which can alternatively accommodate two bags when the C-shaped clamps or bases are rotated approximately 90 degrees away from each other.

OBJECTS OF THE INVENTION

It is therefore an object of the present invention to provide a golf club bag carrier which can alternatively accommodate one or more golf club bags.

It is further object of the present invention to provide a golf club carrier with a plurality of removably adjacent clamps which can swivel outwards from a position to hold a single bag to a position for holding a plurality of bags.

It is further object of the present invention to provide a golf club carrier with a plurality of removably adjacent bases which can swivel outwards from a first position to support a single bag to a second position for supporting a plurality of bags.

It is a further object of the present invention to improve over the disadvantages of the prior art.

SUMMARY OF THE INVENTION

In keeping with these objects and others which may become apparent, the present invention is an adjustable golf cart for accommodating one or more golf club bags. The adjustable golf cart includes a plurality of movable clamps, preferably generally C-shaped, and bases for holding either one or more than one golf club bags.

The golf cart according to the invention includes a supporting frame assembly with a kickstand and adjustable handle, movable C-shaped clamps and movable bases for receiving one or more golf bags, and an extendable wheel assembly. The supporting frame assembly includes a center rod, extending in the longitudinal direction of the cart and coinciding with the intended running direction of the cart.

A plurality of flexible, removably adjacent C-shaped clamps for receiving golf bags are hinged to the upper portion of this center rod, so that the clamps are oriented transversely and substantially perpendicular to the rod. The clamps each rotate approximately 90 degrees about the axis of the rod, and are preferably made of a sturdy, flexible material with a spring-like quality. The clamps have a width slightly less than the width of a common golf bag, so that the clamps will firmly grip the upper end of a golf bag.

Each C-shaped clamp has a groove running along the outside curve, through which a narrow strap is positioned. The straps can be made of any standard material and include fastening means generally known in the art (e.g., velcro), to secure the upper end of a golf bag into the clamps.

It is anticipated that the clamps may also assume other geometric shapes, such as jaw-type clamps or angled clamps.

A pair of removably adjacent bases are hinged to the lower portion of the center rod, so that the bases are orientated transversely and substantially perpendicular to the rod. The bases each rotate approximately 90 degrees about the axis of the rod and coordinate with the C-shaped clamps above them. The bases each have an upper portion shaped as a C-shaped clamp for receiving a golf bag, with grooves and fastening straps as described above for the clamps. A lower portion connects to the upper portion and is shaped as a lightweight circular support adapted to receive the bottom of a golf bag, so that the lower end of a golf bag will rest on the support and be fastened into the base by the straps.

A brace for the wheel assembly is mounted on the lower half of the center rod, so that a longitudinal slot in the brace runs parallel to the rod, on the cart's front side. A slidable pivot bolt connects the upper ends of a pair of radial movement legs to the brace, so that the joint established by the pivot bolt slides smoothly within the longitudinal slot. The bottom ends of the legs are limited on the respective ends of a horizontally extendable telescopic wheel shaft, with the legs and the wheel shaft connected by articulated joints, such as ball joints, or other standard joints commonly known in the art. The horizontal wheel shaft includes a smaller diameter rod long enough to provide smooth reciprocative operation within a larger sleeve. A bracket attached to the center rod encircles the shaft and maintains it in position on the cart, and a lockable nut screwed through the sleeve to contact the inner rod can lock the shaft at its desired length. The shaft has a pair of wheels rotatably mounted on its outer most ends.

When the user extends the wheels apart, the telescopic wheel shaft extends, pushing the bottom ends of the legs transversely outwards, which rotates the upper end of the legs about the fulcrum of the pivot bolt, and slides the joint established by the pivot bolt downwards within the longitudinal slot. Bringing the wheels closer together creates a narrower wheel base. Tightening the nut on the wheel shaft fixes the wheel assembly at its desired width. In this manner, the user can easily and quickly adjust the width of the wheel assembly, depending on the configuration of the golf cart and other user requirements.

An adjustable handle has its lower end connected to a mounting member by the use of a lockable pivot joint. The mounting member is attached to the upper end of the center rod, above the C-shaped clamps, so that the free end of the handle extends diagonally in the forward direction of the cart, for use in pushing or pulling the cart. By unlocking the pivot joint, the handle can be pivoted about the joint from the running position, as shown in FIGS. 1 and 2, to another desired angle or to a folded position adjacent to the center rod.

The lower end of the center rod terminates in a kickstand, extending rearwards of the cart, in order to contact the ground and maintain the cart in an upright position when it is at rest.

The two preferably C-shaped clamps and corresponding bases can be positioned with all four members longitudinally aligned on the rear side of the cart. This configuration accommodates one golf bag, secured into the clamps and bases by the straps. Alteratively, the clamps and corresponding bases are rotated about the center rod. The corresponding bases can be rotated about the center rod to a maximum 90 degrees, or to effectively support the cart with two or more golf bags. When the cart is not in use, the handle can be folded down and the wheel base narrowed to create a compact, lightweight structure for easy carrying and storage. This embodiment permits the convenient conversion of the cart for carrying wither one or two golf bags, or for collapsing into a folded condition when not in use.

A modified form of the present invention provides removably adjacent C-shaped clamps mounted at the end of a horizontally slidable bar. The slidable bars are positioned within a bracket, with one bar resting above the other bar, and the bracket is mounted on the upper portion of the center rod. Sliding the respective horizontal bars outward in opposite directions extends and separates the two clamps outwardly. Lockable nuts screw into the bracket on the front side of the cart to contact each of the slidable bars, so that tightening the nuts locks the bars in place.

The pair of removably adjacent bases are mounted at the lower end of the center bar with a similar slidable bar assembly that permits their horizontal extension. By longitudinally aligning the preferably C-shaped clamps and bases, the golf cart can carry one golf bag.

Alternatively, the user can extend the two clamps and similarly extend the bases, creating a dual golf cart that will accommodate two golf bags, side by side. It is anticipated that more than two clamps can be used for more than two golf club bags.

In a further modified form of the invention each of the C-shaped clamps are mounted on the end of a rotatable arm with the other end of each arm pivotally jointed by a pin to the respective end of a simple horizontal beam. The beam is attached to the center rod above the mounting member of the handle assembly. Rotating the arms about the axes of the pins 180 degrees brings the clamps to an extended position from a longitudinally aligned position. A lockable nut, screwed through the horizontal beam on the front side of the cart to contact the top rotatable arm, locks the clamps into the desired condition. It is, of course, obvious that a similar assembly for the pair of removably adjacent bases, located on the lower part of the rod, permits the outward extension of the pair of bases. It is also obvious that the extendable wheel assembly described previously can be used with any of these modified forms.

Longitudinally aligning the clamps bases permits the golf cart to carry one golf bag. If the clamps and corresponding bases are extended outwardly by the use of the rotatable arms, the cart will carry two or more golf bags. The clamp assembly is in this version located above the handle's mounting member, in order to eliminate the possibility that the handle assembly might interfere with extension of the clamps. Moreover, this embodiment has the versatility of quickly converting from a single golf cart to a dual golf cart, or to a folded condition, while always maintaining a lightweight, compact structure.

Numerous other advantages and features of the present invention will become apparent from the following detailed description of the invention and its various embodiments, from the claims and from the accompanying drawings.

BRIEF DESCRIPTION OF THE DRAWINGS

In the following the invention will be further described with reference to the accompanying drawings, which illustrate by way of example preferred embodiments of the golf bag cart carrier according to the invention.

In the drawings:

FIG. 3 is a fragmentary perspective view of the modified for of the invention, seen from the rear illustrating the C-shaped clamps made outwardly extendable by the use of sliding bars;

FIG. 4 is a fragmentary perspective view, as seen from the top, of the modified form of FIG. 3;

DETAILED DESCRIPTION OF THE DRAWINGS

The golf cart carrier according to the invention comprises a supporting frame assembly with the kickstand and adjustable handle, movable preferably C-shaped clamps and movable bases for receiving one or more golf bags, and an extendable wheel assembly.

Figure 1:
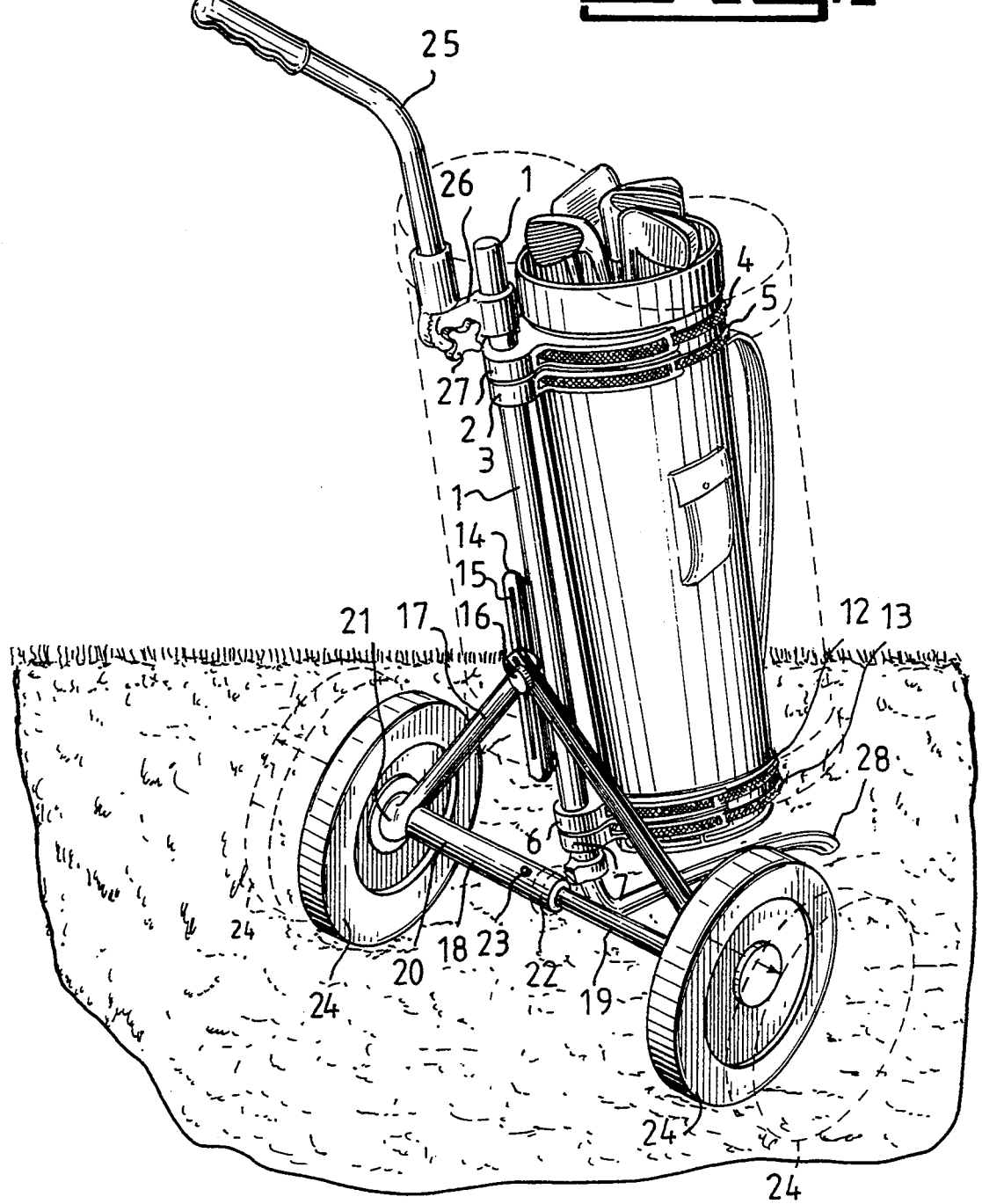
FIG. 1 is a perspective view of the cart as seen from the front, illustrating the rotatable C-shaped clamps and bases and the outwardly extendable wheel base.
Figure 2:
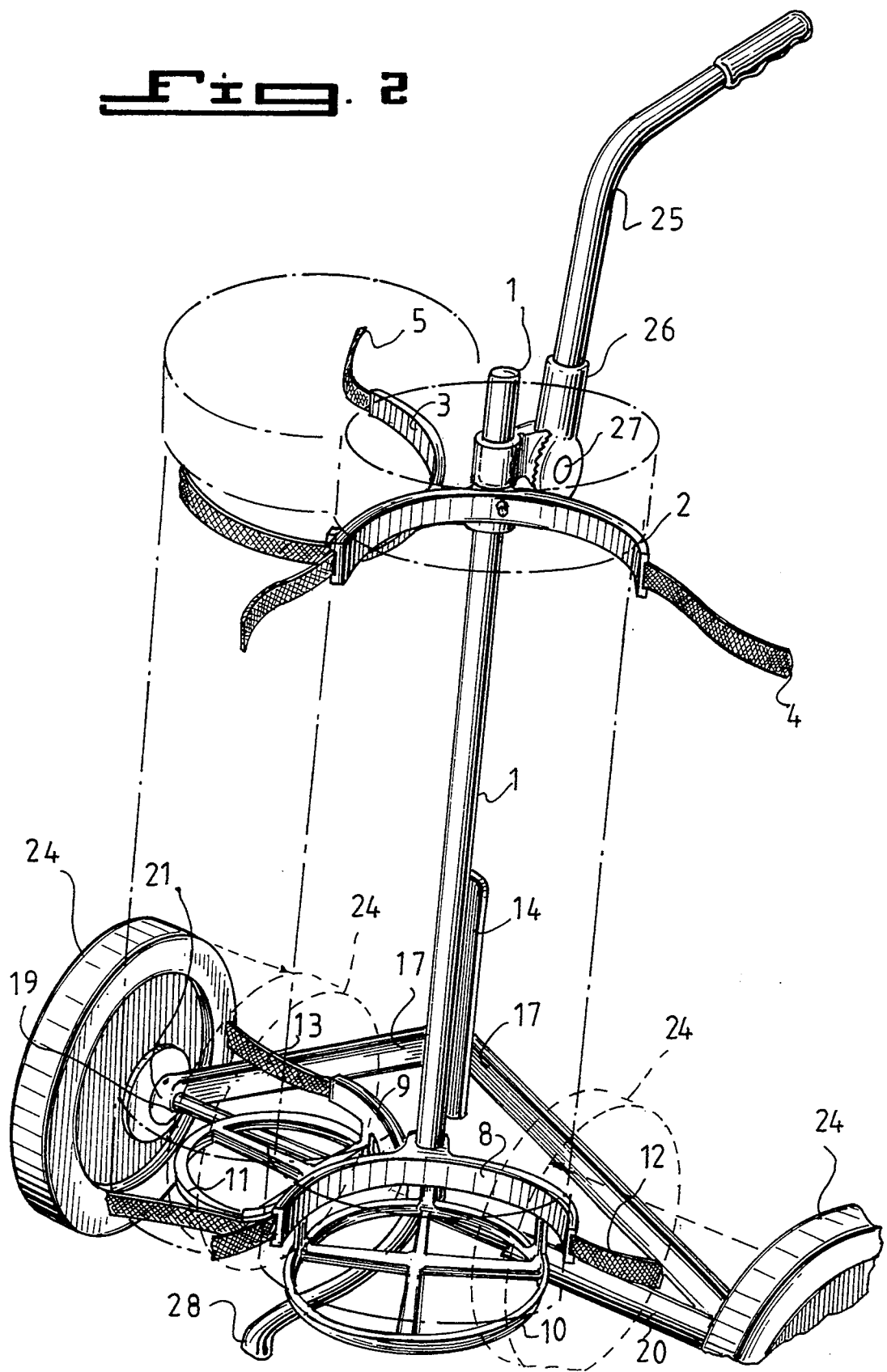
FIG. 2 is a perspective view of the cart in FIG. 1, as seen from the rear, showing a configuration suitable for carrying two golf bags and the outwardly extensible wheel base.

As shown in FIGS. 1 and 2, the supporting frame assembly includes a center rod (1), extending in the longitudinal direction of the cart and coinciding with the intended running direction of the cart.

A pair of flexible, removably adjacent C-shaped clamps (2,3) for receiving golf bags are hinged to the upper portion of this center rod (1), so that they are orientated transversely and substantially perpendicular to the rod. The clamps (2,3) each preferably rotate approximately 90 degrees about the axis of the rod (1). The clamps (2,3) are preferably made of a sturdy, flexible material with a spring-like quality and preferably have a width slightly less than the with of a common golf bag, so that the clamps (2,3) firmly grip the upper end of a golf bag.

Each C-shaped clamp has a groove running along the outside curve, along which one or more narrow straps (4,5) are positioned. The straps (4,5) can be made of any standard material and preferably include fastening means generally known in the art (e.g., velcro), to secure the upper end of a golf bag into the clamps (2,3).

It is anticipated that the clamps may alternatively assume other geometric shapes, such as jaw-like or angular clamps.

A pair of removably adjacent bases (6,7) are hinged to the lower portion of the center rod (1), so that the bases (6,7) are orientated transversely and substantially perpendicular to the rod (1). The bases (6,7) each preferably rotate approximately 90 degrees about the axis of the rod (1) and coordinate with the C-shaped clamps (2,3) above them. The bases (6,7) each have an upper portion (8,9) shaped as a further C-shaped clamp for receiving a golf club bag, with grooves and fastening straps (12,13) as described above for the further clamps (8,9). A lower portion connects to the upper portion and is shaped as a lightweight circular support (10,11) adapted to receive the bottom of a golf bag, so that the lower end of a golf bag will rest on the support (10,11) and be fastened into the base (6,7) by the straps (12,13).

A brace (14) for the wheel assembly is mounted on the lower half of the center rod (1), so that a longitudinal slot (15) in the brace (14) runs parallel to the rod (1), on the cart's front side. A slidable pivot bolt (16) connects the upper ends of a pair of radial movement legs (17) to the brace (14), so that the joint established by the pivot bolt slides smoothly within the longitudinal slot (15). The bottom ends of the legs (17) are limited on the respective ends of a horizontally extendable telescopic wheel shaft (18), with the legs and the wheel shaft (18) connected by articulated joints (21), such as ball joints, or other standard joints commonly known in the art. The horizontal wheel shaft (18) includes a smaller diameter rod (19) long enough to provide smooth reciprocative operation within a larger sleeve (20). A bracket (22) is preferably attached to the center rod (1), encircles the shaft (18) and maintains it in position on the cart.

A lockable nut (23) screwed through the sleeve (20) to contact-the inner rod (19) locks the shaft (18) at its desired length. The shaft (18) has a pair of wheels (24) rotatably mounted on its outer most ends.

As also shown in FIGS. 1 and 2, when the user extends the wheels (24) apart, the telescopic wheel shaft (18) extends, pushing the bottom ends of the legs (17) transversely outwards, which rotates the upper end of the legs (17) about the fulcrum of the pivot bolt (16) and slides the joint established by the pivot bolt (16) downwards within the longitudinal slot (15). Bringing the wheels (24) closer together creates a narrower wheel base. Tightening the nut (23) on the wheel shaft (18) fixes the wheel assembly at its desired width.

In this manner, the user can easily and quickly adjust the width of the wheel assembly, depending on the configuration of the golf cart and other user requirements.

An adjustable handle (25) has its lower end connected to a mounting member (26) by the use of a lockable pivot joint (27). The mounting member (26) is attached to the upper end of the center rod (1), above the C-shaped clamps (2,3), so that the free end of the handle (25) extends diagonally in the forward direction of the cart, for use in pushing or pulling the cart. By unlocking the pivot joint (27), the handle (25) can be pivoted about the joint from the running position, as shown in FIGS. 1 and 2, to another desired angle or to a folded position adjacent to the center rod (1).

The lower end of the center rod (1) terminates in a kickstand (28), extending rearwards of the cart in order to contact the ground and maintain the cart in an upright position when it is at rest, as shown in FIGS. 1 and 2.

As further illustrated in FIG. 1, the two C-shaped clamps (2,3) and corresponding bases (6,7) can be positioned with all four members longitudinally aligned on the rear side of the cart. This configuration will accommodate one golf bag, secured into the clamps (2,3) and bases (6,7) by the straps (4,5,12,13).

Although the drawings show two clamps (2,3) and bases (6,7), it is anticipated that three or more clamps or bases can be used to accommodate three or more golf club bags.

In a further embodiment shown in FIG. 2, the clamps (2,3) and corresponding bases (6,7) are preferably rotated about the center rod. The corresponding bases (6,7) are preferably rotated about the center rod (1) to a maximum 90 degrees or to effectively support the cart with two golf bags.

When the cart is not in use, the handle (25) may be folded downward with the wheel base narrowed to create a compact, lightweight structure for easy carrying and storage. This further embodiment permits the convenient conversion of the cart for carrying either one or two golf bags, or for collapsing into a folded condition when not in use.

A modified form of the invention, as illustrated in FIGS. 3 and 4, includes each of the removably adjacent C-shaped clamps (2a, 3a), as described above, mounted at the end of a horizontally slidable bar (29,30). The slidable bars (29,30) are preferably positioned within a bracket (31) with one bar (29) resting above the other (30), and the bracket (31) is mounted on the upper portion of the center rod (1). Sliding the respective horizontal bars (29,30) outward in opposite directions extends and separates the two clamps (2a, 3a) outwardly. Lockable nuts (32,33) screw into the bracket (31) on the front side of the cart to contact each of the slidable bars (29,30), so that tightening the nuts locks the bars in place.

The pair of removably adjacent bases, as described previously in the prior embodiment, can be mounted at the lower end of the center bar (1) with a similar slidable bar assembly (34) that permits their horizontal extension.

By longitudinally aligning the C-shaped clamps (2a, 3a) and bases, the golf cart can carry one golf bag.

Alternatively, the user can extend the two clamps (2a, 3a) as shown in FIGS. 3 and 4, and similarly extend the bases, creating a dual golf cart that will accommodate two golf bags, side by side.

Figure 5:
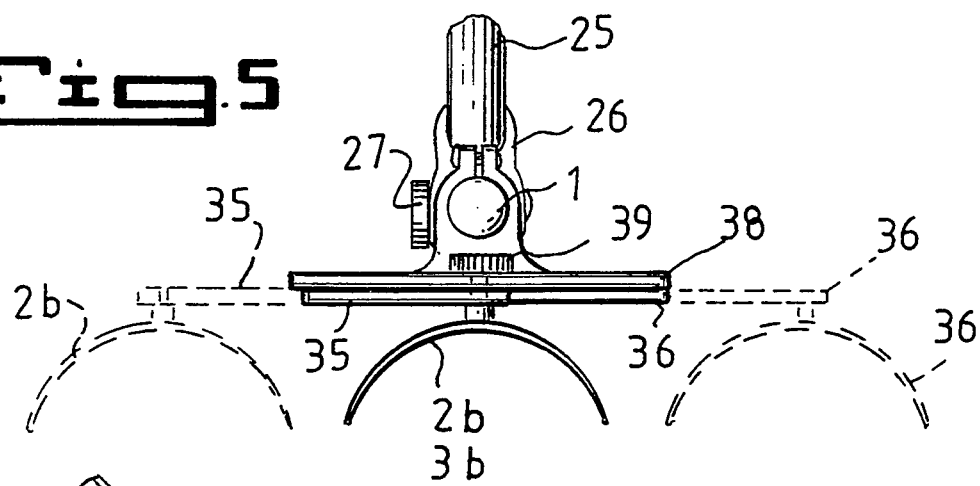
FIG. 5 is a fragmentary top view of a further modified form of the invention, illustrating the C-shaped clamps made outwardly extendable through the use of rotatable arms.
Figure 6:
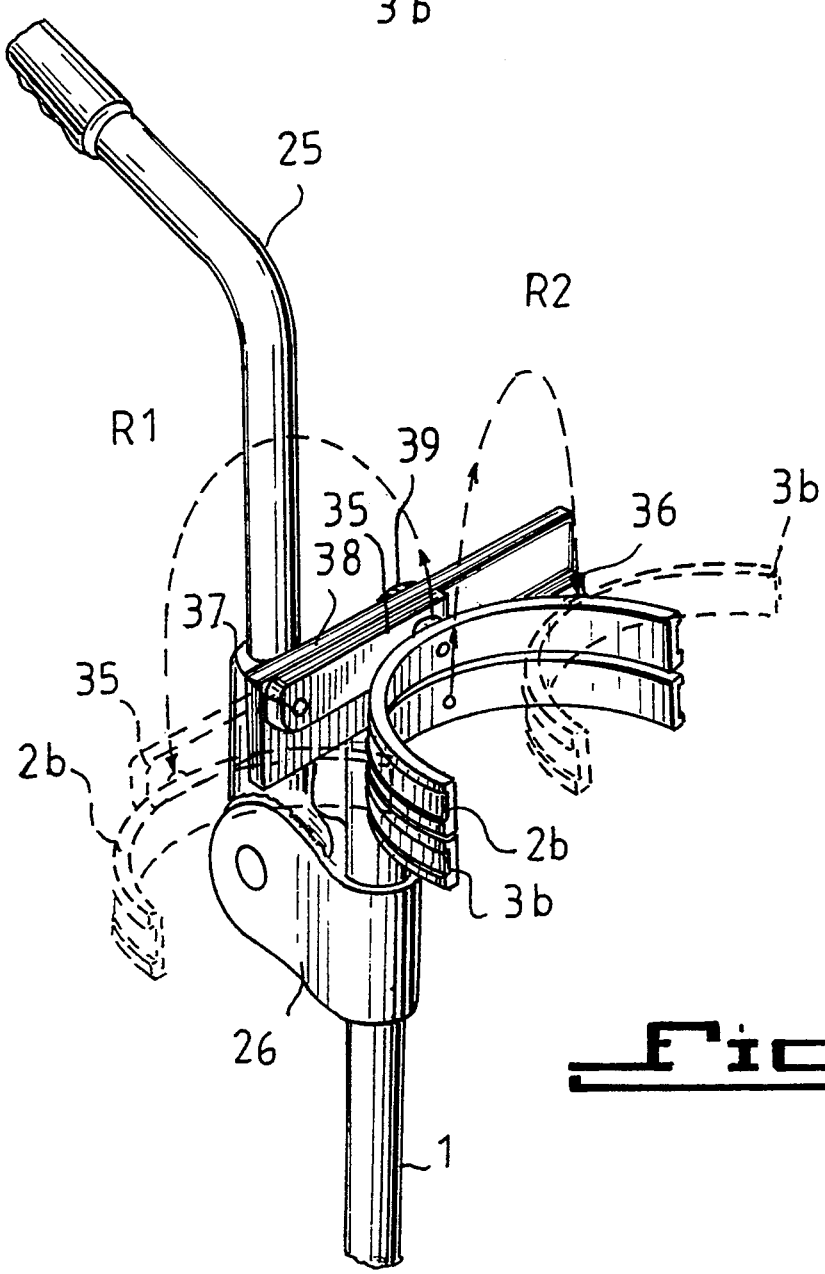
FIG. 6 is a fragmentary perspective view from the rear of this further modified form of FIG. 5.

In a further modified form of the invention, as illustrated in FIGS. 5 and 6, each of the C-shaped clamps (2a, 3b) are mounted on the end of a rotatable arm (35,36) with the other end of each arm pivotally jointed by a pin (37) to the respective end of a simple horizontal beam (38). The beam (38) is attached to the center rod (1) above the mounting member (26) of the handle assembly.

As also shown in FIGS. 5 and 6, rotating the arms (35,36) about the axes of the pins (37) 180 degrees in the directions R1 and R2 brings the clamps (2b, 3b) to an extended position from a longitudinally aligned position.

A lockable nut (39), screwed through the horizontal beam (38) on the front side of the cart to contact the top rotatable arm (35), locks the clamps (2b, 3b) into the desired condition. It is, of course, obvious that a similar assembly for the pair of removably adjacent bases, located on the lower part of the rod (1), will permit the outward extension of the pair of bases. It is also obvious that the extendable wheel assembly described previously can be used with any of these modified forms.

As in the previous forms of the present invention, longitudinally aligning the clamps (2b, 3b) and bases permit the golf cart to carry one golf bag. If the clamps (2b, 3b) and corresponding bases are extended outwardly by the use of the rotatable arms (35, 36), the cart will carry two golf bags. (FIG. 6 shows the clamp assembly located above the handle's mounting member (26) in order to eliminate the possibility that the handle assembly might interfere with extension of the clamps (2b, 3b).

Moreover, this embodiment has the versatility of quickly converting from a single golf cart to a dual golf cart, or to a folded condition, while always maintaining a light weight, compact structure.

The above description has shown particular forms of the embodiment of the invention. However, it is assumed that many minor changes therein will readily suggest themselves to others skilled in the art without departing from the spirit and scope of the invention, as noted in the appended claims.

I claim:

1. An adjustable golf bag carrier cart which comprises:
    a supporting frame assembly,
    a pair of movably adjacent clamps and a pair of movably adjacent base portions attached to said frame assembly,
    said clamps and said base portions being responsive to holding a single golf bag when said clamps and said base portions are in a first position,
    said clamps and said base portions being in respective positional register with each other in said first position,
    said pair of clamps and said pair of base portions being alternatively movable from said first position to a second position to accommodate a pair of golf bags, wherein said pair of clamps are movably adjacent C-shaped clamps and wherein said base portions are a pair of generally disk shaped base portions, said clamps and said base portions holding one bag when the clamps and the base portions are in respective positional register with each other in said first position, and which can alternatively accommodate two golf bags when said C-shaped clamps and said base portions are rotated approximately ninety degrees away from each other to said second position.

2. The adjustable golf bag carrier cart as in claim 1 further wherein said supporting frame assembly includes a kickstand, an adjustable handle, and an extendable wheel assembly.

3. The adjustable golf bag carrier cart as in claim 2 further wherein said supporting frame assembly includes a center rod extending in the longitudinal direction of said cart and coinciding with an intended running direction of said cart.

4. The adjustable golf bag carrier cart as in claim 3 further wherein said C-shaped clamps are hinged to an upper portion of said center rod.

5. The adjustable golf bag carrier cart as in claim 3 further wherein said clamps and said base portions are orientated transversely and substantially perpendicular to said rod.

6. The adjustable golf bag carrier cart as in claim 3 further wherein said clamps and said base portions each rotate approximately 90 degrees about the axis of said rod.

7. The adjustable golf bag carrier cart as in claim 3 further comprising said pair of base portions being hingeable to a lower portion of said center rod, said base portions being oriented transversely and substantially perpendicular to said rod.

8. The adjustable golf bag carrier cart as in claim 3 further wherein said base portions rotate approximately 90 degrees about an axis of said rod, said base portions being in positional register with said C-shaped clamps.

9. The adjustable golf bag carrier cart as in claim 3 further having a brace for said wheel assembly mountable on a lower half of said center rod, said brace having a longitudinal slot running parallel to said rod, on a front side of said cart.

10. The adjustable golf bag carrier cart as in claim 9 further having a slidable pivot bolt which connects to upper ends of a pair of radial movement legs to said brace, wherein a joint established by said pivot bolt slides smoothly within said longitudinal slot and wherein bottom ends of said legs move on respective ends of a horizontally extendable telescopic wheel shaft, said legs and said wheel shaft being connected to said cart by articulated joints.

11. The adjustable golf cart carrier as in claim 10, further comprising said horizontal wheel shaft having a smaller diameter rod, said rod being long enough to provide smooth reciprocative operation within a larger sleeve, a bracket attachable to said center rod, said bracket encircling said shaft, and a lockable nut screwable through said sleeve, said nut contacting said inner rod to lock said shaft at a desired length, said shaft further having a pair of wheels rotatably mountable on outer most ends of said shaft, said wheels extendable apart, said telescopic wheel shaft capable of pushing bottom ends of said legs transversely outwards, which said rotates shaft an upper end of said legs about a fulcrum of said pivot bolt, said shaft capable of sliding a joint established by said pivot bolt downwards within a longitudinal slot for bringing said wheels closer together to create a narrower wheel base.

12. The adjustable golf cart carrier as in claim 3 further comprising:
an adjustable handle connectable at its lower end to a mounting member by means of a lockable pivot joint, said mounting member attachable to an upper end of said center rod, above said C-shaped clamps a free end of said handle extendable diagonally in the forward direction of said cart, for moving said cart, the handle can be pivotable about said joint from a running position, to another desired position adjacent to said center rod, further wherein a lower end of said center rod terminates in a kickstand, said kickstand extending rearwards of said cart, said kickstand contactable with the ground for maintaining said cart in an upright position while at rest, said two C-shaped clamps and said corresponding base portions being positionable in longitudinal alignment on a rear side of said cart to accommodate one golf bag, said bag securable into said clamps and said base portions by said straps, said clamps and said base portions being rotatable about said rod to support a plurality of golf bags, said handle being foldable downwardly to a storage position when not in use.

13. The adjustable golf bag carrier cart as in claim 1 further wherein said clamps are made of a sturdy, flexible material having a spring-like quality.

14. The adjustable golf bag carrier cart as in claim 1 further wherein said clamps have a width slightly less than the width of a common golf bag, said clamps capable of firmly gripping an upper end of said golf bag.

15. The adjustable golf bag carrier cart as in claim 1 further wherein each said C-shaped clamp having a groove running along an outside circumferential curve of said clamp through which a narrow strap is positioned.

16. The adjustable golf bag carrier cart as in claim 15 further wherein said straps include fastening means, said fastening means securing an upper end of said golf bag into said clamps.

17. The adjustable golf bag carrier cart as in claim 1 further wherein said base portions each have an upper portion shaped as a C-shaped clamp for receiving said golf bag, said base portions further having grooves and fastening straps surrounding said base portions.

18. The adjustable golf bag carrier cart as in claim 1 further wherein a lower portion of said base connects to an upper portion of said base, said base adapted to receive a bottom of said golf bag, wherein a lower end of said golf bag rests on a support and is fastened into said base by said straps.

19. An adjustable golf bag carrier cart which comprises:
a supporting frame assembly,
a plurality of movably adjacent clamps and a plurality of movably adjacent base portions attached to said frame assembly,
said clamps and said base portions being responsive to holding a single golf bag when said clamps and said base portions are in a first position,
said clamps and said base portions being in respective positional register with each other in said first position,
said plurality of clamps and said plurality of base portions being alternatively movable from said first position to a second position to accommodate a plurality of golf bags, wherein said cart includes a supporting frame assembly having a center rod extending in a longitudinal direction of said cart and coinciding with an intended running direction of said cart, said plurality of clamps being movably adjacent C-shaped clamps, first and second bar assemblies each having a plurality of horizontally slidable bars, each bar assembly being mounted to said center rod by a bracket, said slidable bars being movable within their respective brackets with one of said bars located above said other bar, each clamp being mountable at an end of a respective one of said slidable bars of said first bar assembly, said bars being slidable outwardly in opposite directions for extending and separating said clamps outwardly, and said movably adjacent base portions being mountable on respective slidable bars of said second bar assembly for permitting horizontal extension of said bases.

20. An adjustable golf bag carrier cart which comprises:
a supporting frame assembly,
a plurality of movably adjacent clamps and a plurality of movably adjacent base portions attached to said frame assembly, said clamps and said base portions being responsive to holding a single bag when said clamps and said base portions are in a first position,
said clamps and said base portions being in respective positional register with each other in said first position,
said plurality of clamps and said plurality of base portions being alternatively movable from said first position to a second position to accommodate a plurality of golf bags, wherein each of said clamps are mountable on an end of a rotatable arm with another end of each arm being pivotally joined by a pin to a respective end of a first horizontal beam, said beam being attachable to a center rod above a mounting member of a handle assembly, said arm being rotatable 180 degrees about axes of a plurality of pins for bring said clamps to an extended position from a longitudinally aligned position, a lockable nut disposed to said horizontal beam on a front side of the cart, said nut contacting said rotatable arm for locking said clamps into said first position, and wherein each base portion is mountable on an end of a rotatable arm joined to a respective end of a second horizontal beam, said second beam being attachable to a lower part of the center rod for permitting an outward extension of said base portions.

* * * * *